United States Patent

Knauer

[15] 3,651,271

[45] Mar. 21, 1972

[54] CIRCUIT ARRANGEMENT INCLUDING A RELAXATION OSCILLATOR FOR ALTERNATELY PROVIDING RINGING-TONE AND SUPERVISORY SIGNALS TO SUBSCRIBER STATIONS

[72] Inventor: Hans-Ulrich Knauer, Ludwigsburg, Germany

[73] Assignee: International Standard Electric Corporation, New York, N.Y.

[22] Filed: Apr. 9, 1970

[21] Appl. No.: 26,940

[30] Foreign Application Priority Data

Apr. 17, 1969 Germany ....................P 19 19 585.8

[52] U.S. Cl. ....................................179/18 HB, 179/84 R

[51] Int. Cl. ....................................H04m 1/26, H04q 9/00

[58] Field of Search ...............179/18 HB, 84 R, 84 UF, 84 T, 179/84 A

[56] References Cited

UNITED STATES PATENTS 3,492,437 1/1970 Feiner et al......................179/18 HB

*Primary Examiner*—Kathleen H. Claffy
*Assistant Examiner*—William A. Helvestine
*Attorney*—C. Cornell Remsen, Jr., Walter J. Baum, Paul W. Hemminger, Charles L. Johnson, Jr., Delbert P. Warner and James B. Raden

[57] ABSTRACT

A loop current supervisory device and a central tone generator are coupled to a line leading to a called subscriber. Each is alternately rendered operative via a central astable relaxation oscillator. Thus loop current supervision and the ringing phase are clearly separated from each other.

9 Claims, 1 Drawing Figure

PATENTED MAR 21 1972 3,651,271
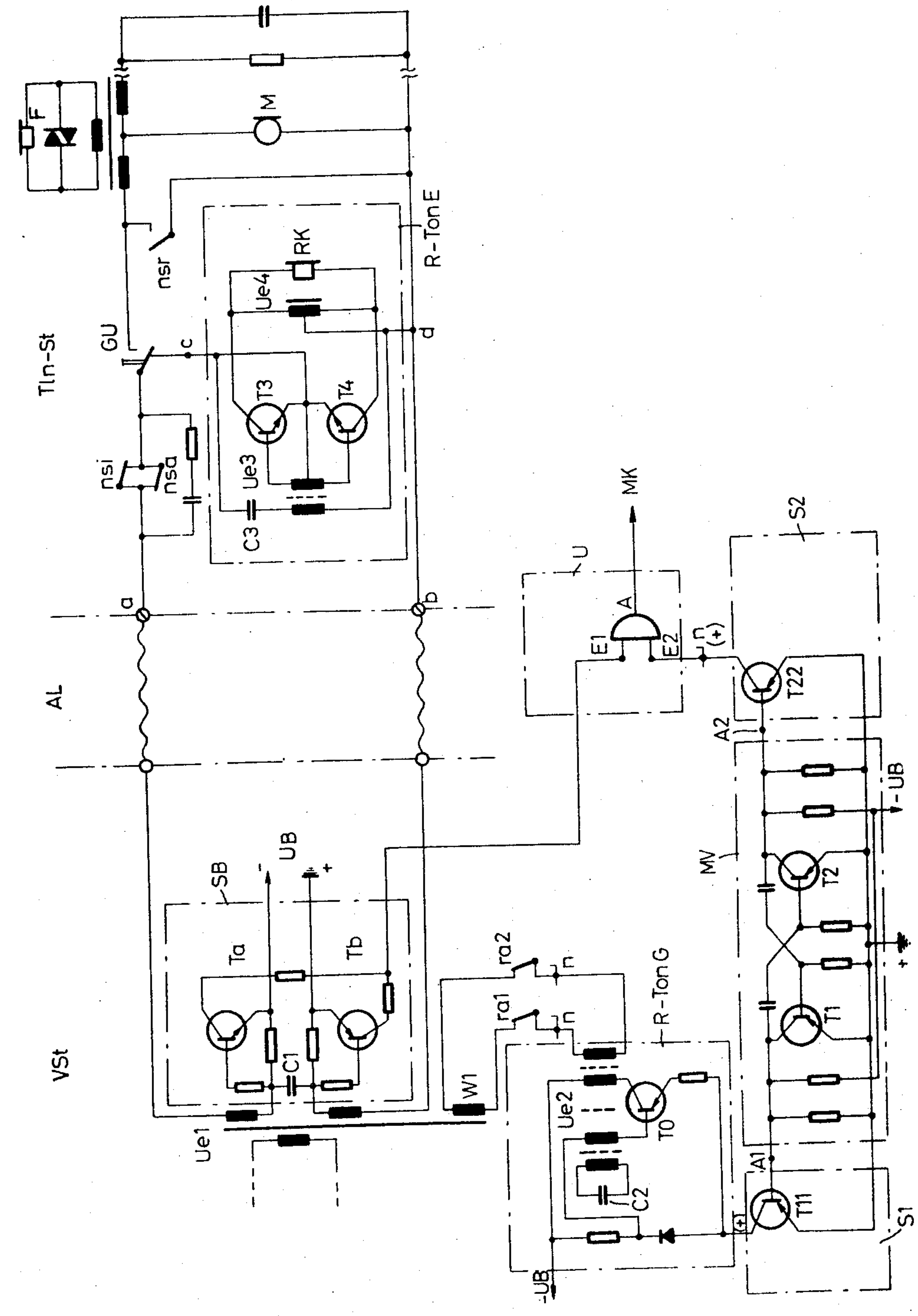
INVENTOR
Hans-Ulrich Knauer
BY Delbert P. Warner
ATTORNEY

CIRCUIT ARRANGEMENT INCLUDING A RELAXATION OSCILLATOR FOR ALTERNATELY PROVIDING RINGING-TONE AND SUPERVISORY SIGNALS TO SUBSCRIBER STATIONS

The invention relates to a circuit arrangement for ringing subscriber stations equipped with ringing-tone receivers, and for providing answer supervision during alternate intervals for telecommunication systems, and particularly telephone switching systems.

It is well known that with ordinary ringing using low-frequency alternating current, which is superposed upon the normal direct supply voltage, an unequivocal answer recognition during an applied ringing signal is not readily possible. The loop current supervisory device is connected in series with the ringing voltage source and the direct current supply source of the system, so that, at the application of a ringing signal, voltages of different polarities appear at the loop current supervisory device. Therefore, high demands are made on the design of the loop current supervisory device.

With the introduction of a voice-frequency ringing signal and, in the subscriber station, of a ringing-tone receiver having a subsequently arranged electroacoustic signalling device, the ringing signals great amplitude, as used in the well-known low-frequency alternating current ringing method, are no longer required. However, the difficulty with this ringing method consists in that, during the ringing phase, the ringing-tone receiver in the subscriber station itself requires direct supply current which also represents a corresponding loop closure and must be distinguished from the normal direct supply current in the case of an answer of the subscriber. This again results in restrictions in the design of the loop current supervisory device.

It is the object of the invention to provide a circuit arrangement for ringing subscriber stations equipped with ringing-tone receivers, including answer supervision, for telecommunication systems, particularly telephone switching systems, wherein the ring current circuits and the loop current supervisory circuits can be designed to be independent of each other, without, however, causing an appreciable delay in the answer recognition. According to the invention, the circuit arrangement for ringing subscriber stations equipped with ringing-tone receivers, including answer supervision for telecommunication systems, particularly telephone switching systems, is characterized in that during the ringing condition the line leading to the called subscriber station is, at the exchange station, coupled with a loop current supervisory device and a central ringing-tone generator, and that said ringing-tone generator and said loop current supervisory device can be alternately rendered operative via the two output signals of a central astable relaxation oscillator. By this periodic separation of ringing circuit and loop current supervisory circuit during the ringing phase, the design conditions for all circuits concerned are greatly simplified. The delay in the recognition of the subscriber line during the ringing phase can amount to half the period of the central astable relation oscillator at the most and can therefore be neglected.

According to another feature of the invention, the investment in control apparatus can be minimized by the fact that the loop current supervisory devices of all lines are combined and can be simultaneously rendered operative by the astable relaxation oscillator, and that each line leading to a called subscriber station can be coupled to the output of a central ringing tone generator via separate connecting contacts.

Detail of the invention will become more apparent from the embodiment of a circuit arrangement according to the invention which will now be described with reference to the accompanying drawing, and from the sub-claims.

The subscriber station Tln–St, which can be reached over the two wires *a* and *b* of the subcriber line AL, comprises in a well-known manner a microphone M and a receiver F which are connected via a hybrid termination. When the subscriber station is at rest, the hook switch contact GU disconnects this hybrid from the subscriber line AL and connects the ringing-tone receiver R–TonE, which is designed as a two-terminal network. The terminal *c* of the ringing-tone receiver leads via the closed break contact of the hook switch contact GU to the wire *a* of the subscriber line AL, while the terminal *d* is permanently connected with the wire *b*. When the subscriber station is at rest, the contacts *nsi*, *nsa* and *nsr* of the dial switch are in the position shown in the drawing.

The ringing-tone receiver R–TonE has in its input circuit a series-resonant circuit which is formed of the capacitor C3 and a winding of the transformer Ue3 and is tuned to the frequency of the ringing signals of the ringing-tone generator R–TonG. An incoming ringing signal controls the transistors T3 and T4 which are connected in a push-pull arrangement, so that an amplified ringing signal is sent out at the output of the transformer Ue4 and at the electroacoustic transducer RK, e.g., of another receiver. During the ringing phase, the ringing-tone receiver R–TonE receives its DC voltage via the feeding bridge SB which terminates the subscriber line AL at the exchange station VSt.

At the exchange station VSt there is provided a central ringing-tone generator R–TonG which sends out ringing signals having a frequency of, e.g., 1,700 Hz. In a well known manner this ringing-tone generator contains a transistor To and a resonant circuit which is formed of the capacitor C2 and a winding of the transformer Ue2. During a ringing phase, the output of this ringing-tone generator is connected with the winding W1 of the line transformer Ue1 of the subscriber line AL via the connecting contacts *ra*1 and *ra*2. The ringing-tone receiver R–TonG transmits a ringing signal only if the switching stage S1 with the transistor T11 conducts and connects ground potential to the feeder of the ringing-tone generator R–TonG.

This switching stage S1 is controlled by an output signal A1 of a central astable relaxation oscillator, e.g., a symmetrically arranged transistor multivibrator MV. The transistors T1 and T2 of this multivibrator are alternately rendered conductive at a frequency which is determined by the dimensions of the RC–networks of the multivibrator. This multivibrator MV operates, for example, at 25 Hz., so that the switching stages S1 and S2 are alternately conducting for 20 milliseconds each.

When the switching stage S1 with the transistor T11 conducts, the ringing-tone generator R–TonG transmits the ringing signal. As the multiple symbols *n* at the output of the ringing-tone generator R–TonG indicate, the ringing signal can be applied simultaneously to several lines. This depends only on the position of the associated connecting contacts *ra*1 and *ra*2.

The ringing signal is applied to the ringing-tone receiver R–TonE via the line transformer Ue1 and the line AL. The electroacoustic transducer RK transmits a corresponding ringing signal. If the handset at the subscriber station T1n–St is lifted during this time, the ringing-tone receiver R–TonE is switched off via the hook switch contact GU and the normal station circuit with the microphone M and the receiver F is switched on. The loop current flows over the subscriber line AL. A voltage drop occurs at the feed resistors of the feeding bridge SB, which voltage drop must not necessarily be different from that occurring during the feeding of the ringing-tone receiver R–TonE. The switching condition of the supervisory transistors Ta and Tb is of no importance because the selected supervisory AND-circuit U at the input E2 is not marked.

When the multivibrator MV is in its other switching position, the ringing-tone generator R–TonG is switched off via the switching stage S1 which now is nonconducting. The ringing signal is interrupted. The ringing-tone receiver R–TonE no longer receives direct supply current, so that in the feeding bridge SB the transistors TA and TB are also nonconducting. Although the switching stage S2 with the conducting transistor T22 now marks the input E2 of the AND-circuit U, no answer criterion MK is transmitted because normally the input E1 is not selected. Only if, during the switching of the switching stage S2, the subscriber loop over the speech circuit is closed, is the AND-circuit U controlled via both control inputs and transmits the answer criterion MK. In this case, the supervisory circuit with the switching stages Ta and Tb is completely independent of the ringing circuit. Its design therefore presents no difficulties. It must only be insured that under worst-case line conditions and with the loop being closed the transistors Ta and Tb apply an unequivocal control signal to the AND-circuit U.

This periodic separation of ringing and answering during the ringing phase causes a delay in the answer recognition of 20 milliseconds at the most, i.e., half the period of the central multivibrator.

As the multiple symbol at the control input E2 of the AND-circuit U indicates, several AND-circuits, which are associated with different lines, are combined and simultaneously controlled by the central multivibrator MV. The AND-circuits then deliver the individual answer criteria associated with the lines.

What is claimed is:

1. A circuit arrangement for providing ringing tone to subscriber stations equipped with ringing-tone receivers and for providing answer supervision of said subscriber stations, said arrangement comprising a telephone exchange station coupled to a loop current supervisory device and to a central ringing-tone generator, an astable relaxation oscillator having two output terminals, means coupling said ringing tone generator to one output terminal and said loop current supervisory device to the other output terminal, said oscillator providing energization signals alternately to said respective terminals to alternately supply ringing tone and supervisory service to a called subscriber.

2. A circuit arrangement according to claim 1, in which the astable relaxation oscillator is designed to produce energization signals of equal duration and oscillates at a selected frequency.

3. A circuit arrangement according to claim 1, characterized in that current from each of a plurality of loop current supervisory devices is applied at a first input of a corresponding AND-gate, all of the gates being rendered operative by application of current through a common connection to a second input terminal from the astable relaxation oscillator.

4. A circuit arrangement according to claim 1, in which each of a plurality of lines leading to a called subscriber station is coupled to the output of a central ringing-tone generator via separate connecting contacts.

5. A circuit arrangement according to claim 1, in which the central ringing-tone generator is switched on and off via a separate switch controllable by an output signal of the astable relaxation oscillator.

6. A circuit arrangement according to claim 5, in which supply voltage for the central ringing-tone generator is connected via the switch.

7. A circuit arrangement according to claim 1, in which for supervising the loop current, a supervisory circuit employing a plurality of supervisory switches is connected in parallel to a feeding bridge of the line, which supervisory switches, at a loop closure, provide the first input to a supervisory AND-circuit whose second input is provided by a central astable relaxation oscillator, such that when the inputs to the AND-circuit energize it a signal indicating that a called subscriber has answered appears at the output of said AND-circuit.

8. A circuit arrangement according to claim 3, including a plurality of AND-gates, means coupling the second inputs of said AND-gate representing different loop current supervisory devices in parallel and to the associated switching stage of the central astable relaxation oscillator.

9. A circuit arrangement according to claim 4, in which the ringing-tone signal of the ringing-tone generator is, via a separate winding of a line transformer, applied to the line leading to the called subscriber station.

* * * * *